United States Patent
Jenkins

[19]

[11] Patent Number: 5,992,351
[45] Date of Patent: Nov. 30, 1999

[54] CLUMPABLE ANIMAL LITTER WITH IMPROVED ODOR CONTROL

[75] Inventor: Dennis B. Jenkins, Brentwood, Calif.

[73] Assignee: The Clorox Company, Oakland, Calif.

[21] Appl. No.: 08/832,897

[22] Filed: Apr. 3, 1997

[51] Int. Cl.[6] ............................................. A01K 1/015
[52] U.S. Cl. .................................................... 119/173
[58] Field of Search ................................. 119/171, 173

[56] References Cited

U.S. PATENT DOCUMENTS

| | | | |
|---|---|---|---|
| Re. 33,983 | 7/1992 | Hughes ................................ | 119/173 |
| 3,352,792 | 11/1967 | Clark et al. ............................ | 252/193 |
| 4,263,873 | 4/1981 | Christianson et al. .................. | 119/173 |
| 4,488,908 | 12/1984 | Goodwin et al. ........................ | 106/75 |
| 4,571,389 | 2/1986 | Goodwin et al. ........................ | 119/171 |
| 4,641,605 | 2/1987 | Gordon .................................. | 119/173 |
| 4,949,672 | 8/1990 | Ratcliff et al. .......................... | 119/173 |
| 5,000,115 | 3/1991 | Hughes .................................. | 119/173 |
| 5,005,520 | 4/1991 | Michael ............................... | 119/171 X |
| 5,014,650 | 5/1991 | Sowle et al. ............................ | 119/171 |
| 5,018,482 | 5/1991 | Stanislowski et al. .................. | 119/173 |
| 5,094,190 | 3/1992 | Ratcliff et al. .......................... | 119/173 |
| 5,129,365 | 7/1992 | Hughes .................................. | 119/173 |
| 5,135,743 | 8/1992 | Stanislowski et al. ................ | 424/76.6 |
| 5,176,108 | 1/1993 | Jenkins et al. .......................... | 119/173 |
| 5,183,010 | 2/1993 | Raymond et al. .................. | 119/173 X |
| 5,183,655 | 2/1993 | Stanislowski et al. ................ | 424/76.6 |
| 5,317,990 | 6/1994 | Hughes .................................. | 119/173 |
| 5,359,961 | 11/1994 | Goss ...................................... | 119/173 |
| 5,386,803 | 2/1995 | Hughes .................................. | 119/173 |
| 5,503,111 | 4/1996 | Hughes .................................. | 119/173 |

*Primary Examiner*—Robert P. Swiatek
*Assistant Examiner*—Elizabeth Shaw
*Attorney, Agent, or Firm*—Joel J. Hayashida

[57] ABSTRACT

The invention provides a clumpable animal litter with improved odor control comprising:

a) water-swellable clay particles capable of adhering other such particles upon contact with moisture; and b) an odor controlling-effective amount of a boron compound which controls odors arising from the contact of said clay particles with moisture.

10 Claims, 7 Drawing Sheets

Effect of Boron on Reduction of Ammonia and Malodor
Booth headspace after 10 days of real cat use

CLUMPABLE ANIMAL LITTER WITH IMPROVED ODOR CONTROL

BACKGROUND OF THE INVENTION

1. Field of the Invention

The invention relates to a clumpable or scoopable animal litter to which has been applied a boron compound odor-inhibiting agent.

2. Brief Statement of the Related Art

Because of the growing number of domestic animals used as house pets, there is a need for litters so that animals may micturate, void or otherwise eliminate liquid or solid waste indoors in a controlled location. However, inevitably, waste build-up leads to malodor production.

One solution to the malodor problem arising from used animal litter has been the introduction of a new form of cat litter comprising a litter composition which contains bentonite clay particles. Bentonite is a water-swellable clay which, upon contact with moist animal waste, is able to agglomerate with other moistened bentonite clay particles. This thus isolates the moist animal waste by the agglomeration of the moist clay particles. The agglomerations form an isolatable clump, which can be removed from the litter. Examples of this type of clumping or scoopable litter technology are disclosed in Hughes, U.S. Pat. Nos. 5,503,111; 5,386,803; 5,317,990; 5,129,365 and U.S. Reissue Pat. No. RE 33,983, all of which are incorporated herein by reference.

On the other hand, boron-containing compounds, especially boric acid, have been identified as effective additives to various non-clumping clay-based animal litters. These are discussed in, for example, Ratcliff et al., U.S. Pat. Nos. 4,949,672 and 5,094,190, Jenkins et al., U.S. Pat. Nos. 5,176,108, and Stanislowski et al., U.S. Pat. Nos. 5,018,482, 5,135,743 and 5,183,655, all of which are incorporated herein by reference. Still other references have discussed the use of borax in a cat litter in which a water soluble polymer present is caused to gel or harden by the presence of borax as a reaction initiator or catalyst, but not as an odor control agent. See Goss et al., U.S. Pat. No. 5,359,961 and Raymond, U.S. Pat. No. 5,183,010. Other patents discuss the use of borax, albeit in a non-clumping animal litter, for example, Clark et al., U.S. Pat. No. 3,352,792, and Christianson, U.S. Pat. No. 4,263,873.

Finally, Gordon, U.S. Pat. No. 4,641,605, discloses the use of various buffering agents, including sodium borate, in a litter in which a strong oxidant, sodium or ammonium persulfate is present to reduce odors in animal litters.

However, none of the foregoing art teaches, discloses or suggests that boron compounds added can reduce the clumping ability of clumping clay litters. Further, none of the foregoing art teaches, discloses or suggests that the addition of boron-containing compounds to clumping animal litters is effective to reduce malodors. Finally, none of the art discloses, teaches or suggests that this odor control—which is attributable to inhibiting the fermentation of urea to reduce the generation of ammonia—can be accomplished without hindering the adherence or agglomeration of clumpable clay litters when contacted with moisture.

SUMMARY OF THE INVENTION

The invention provides a clumpable animal litter with improved odor control comprising:

a) water-swellable clay particles capable of adhering other such particles upon contact with moisture; and b) an odor controlling-effective amount of a boron compound which controls odors arising from the contact of said clay particles with moisture.

The odor controlling animal litter can further include adjuncts selected from dyes, further (and different) antimicrobial agents, deodorants, fragrances, pigments, dedusting compounds, and mixtures thereof.

DETAILED DESCRIPTION OF THE PREFERRED EMBODIMENTS

The present invention provides an odor control animal litter in which ammonia formation due to decomposition of urea present in animal waste may be affected by one or more mechanisms: (1) Urease Inhibition. Urease is an enzyme which is produced by many bacteria and other microflora. Urease acts as a catalyst to break down urea into ammonia via the following chemical pathway:

Control of urease, via competition, denaturation, or enzyme poisoning, would therefore significantly reduce the formation of ammonia. (2) Bacterial Inhibition. As previously discussed, bacteria and other microflora appear to be sources for urease. Thus, reduction of bacteria through antimicrobial action of the odor control agents would also significantly control odor formation.

It has been surprisingly discovered that a dramatic reduction in odor formation in used animal litter can occur if the clumping clay particles used as the litter base are contacted with an odor-controlling-effective amount of a boron-based material at a critical active boron level.

1. Boron-Based Odor Control Agent:

Borax, or, more accurately, di-alkali metal tetraborate n-hydrate (preferably, $Na_2B_4O_7 \cdot nH_2O$, where n=4, 5 or 10), is the preferred compound for use in the invention. Borax decahydrate is the most commonly found form of borax and is the compound assumed when one discusses borax. Borax pentahydrate is the preferred compound. Other boron-based compounds potentially suitable for use are disclosed in Kirk-Othmer, *Encyclopedia of Chemical Technology*, 3rd Ed., Vol. 4, pp. 67–109 (1978), said pages being incorporated herein by reference. Borax can be obtained from such vendors as U.S. Borax and North American Borax.

Borax appears to provide multiple benefits in odor control by: (1) acting as a urease inhibitor, which controls odors by preventing enzymatic breakdown of urea; (2) having bacteriostatic properties, which appear to help control odor by controlling the growth of bacteria which are responsible for production of the urease enzymes.

An alternative odor control animal litter additive is boric acid. See, Kirk-Othmer, *Encyclopedia Chemical Technology*, 3rd Ed., Vol. 4, pp. 71–77 (1978), incorporated herein by reference. Boric acid has the structure $H_3BO_3$. Boric acid is available from such suppliers as Kerr-McGee Corporation. Polyborate, tetraboric acid, sodium metaborate and other forms of boron are also appropriate alternative materials.

However, it has been surprisingly found in the invention that one must control the upper level of boron-containing compound in the inventive litters because the presence of such boron-containing compounds can actually interfere with the clumping ability, or clump strength, of the clay litters, when the litter is moistened, or contacted with moist wastes.

An odor controlling effective amount is defined as at least about 0.02% equivalent boron, more preferably at least greater than 0.03%. The preferred range varies from about 0.02 to about 1%, by weight of the composition. The more preferable range is about 0.02 to 0.75% by weight of the composition. It is most preferred that 0.02 to 0.15%, by weight of the composition be used. Assuming this critical range is attained, those skilled in the art will adjust the compositional levels to ensure effective odor control and cost effectiveness.

Goss et al., U.S. Pat. No. 5,359,961 and Raymond et al., U.S. Pat. No. 5,183,010, both teach an alternative to using clumping clay litters by using an added polymer as a bonding agent in an artificially bonding clay. In this artificially clumping clay, borax is used as a gel initiator or accelerator when combined with the polymeric material (Goss: galactomannan gum; Raymond: starch). It is for this reason that the amount of borax present in either Goss or Raymond be present in an amount which is either equivalent to, or less than, the amount of polymer present. However, in view of related teachings, it is not surprising that borax could be used in either Raymond or Goss to increase gellation of a polymer. This has been previously taught by Nickerson, U.S. Pat. No. 3,632,786, and Kaufmann et al., U.S. Pat. Nos. 4, 828,744 and 4,626,372, all of which teach that borax can complex with polymers in an aqueous environment to provide desirable or undesirable gelling, as the case may be.

In the following discussion, percent boron is defined as the amount of atomic boron delivered in wt. %. Percent boron is determined by calculating the amount of atomic boron in a boron-containing compound. So, for boric acid, borax decahydrate and borax pentahydrate, percent boron is:

$$1 \text{ g boric acid}^1 \cdot \frac{(10.81 \text{ g B}^2)}{61.84 \text{ g boric acid}} = 0.1748 \times 100\% = 17.48\%$$

$$1 \text{ g borax}^3 \cdot \frac{(43.24 \text{ g B}^2)}{381.37 \text{ g borax}} = 0.1134 \times 100\% = 11.34\%$$

$$1 \text{ g borax}^4 \cdot \frac{(43.24 \text{ g B}^2)}{291.37 \text{ g borax}} = 0.1484 \times 100\% = 14.8\%$$

-continued

1. Molecular weight of boric acid ($H_3BO_3$) is 61.84.
2. Atomic weight of boron is 10.81. In boric acid, there is only one atom of boron; in borax, there are four.
3. Molecular weight of borax ($Na_2B_4O_7 \times 10\ H_2O$) is 381.37, assuming borax decahydrate.
4. Molecular weight of borax ($Na_2B_4O_7 \times 5\ H_2O$) is 291.37, assuming borax pentahydrate.

The borax is powdered or comminuted solids, and can be combined with a liquid carrier such as water or water and a solvent, emulsifier or a hydrotrope, if necessary. Adding the borax additive via liquid carrier may help to evenly distribute the additive to at least a portion of the litter material.

2. Clumping Litter materials:

A wide variety of materials can be used for clumping litters. For example, porous clays which swell in contact with water or moisture are readily adaptable for use as the absorbent substrates needed for litters. Their ability to absorb or adsorb moisture makes them excellent candidates for litters. Most importantly, in the invention, clays demonstrate superior odor control properties when dosed with boron-containing compounds. Suitable litters include sepiolite, bentonite, hectorite, beidelite, nontronite, saponite and other equivalent materials known to those skilled in the art. Especially preferred are clays comprising principally alkali metal or alkaline earth bentonites, such as sodium bentonite, calcium bentonite, and sodium/calcium bentonite blends. Exemplary such clays are disclosed in Hughes, U.S. Pat. Nos. 5,503,111; 5,386,803; 5,317,990; 5,129,365 and U.S. Reissue Pat. No. RE 33,983, all of which are incorporated herein by reference. The clay particles are typically comminuted. That is, they are pelletized, ground or formed into particles which have a size varying from 0.05 to 10,000 microns, although such particle size does not appear critical to the practice of the invention. Desirably, a portion of the litter can contain a microencapsulated fragrance described in Colborn et al., U.S. Pat. No. 4,407,231, incorporated herein by reference.

3. Adjunct materials:

Suitable adjuncts can be added to the litters of this invention. For instance, there are dyes and pigments such as suitably treated titanium dioxide; additional and different bacteriostats and germicides such as quaternary ammonium compounds, pine oil (see Stanislowski et al., U.S. Pat. No. 5,016,568 and the previously mentioned Stanislowski et al. patents), iodophores (such as disclosed in Baldry et al., U.S. Pat. No. 5,109,805) and certain 3-isothiazolones (sold under the trademark KATHON®); chemical deodorants, such as sodium bicarbonate, which differ from the boron-based compounds of the invention; fragrances (such as those available from such commercial vendors as Quest, Sozio, Bush Boake and Allen, Firmenich, Mane U.S.A., International Flavours and Fragrances, Inc., Dragoco, Noville, Bemay and Givaudain), which fragrances can additionally be uncoated (e.g., fragrance blends) or encapsulated (as in U.S. Pat. No. 4,407,231); dedusting compounds or agents, such as water-soluble polymeric resins, e.g., polyvinyl alcohol, polyvinyl acetate, polyvinyl pyrrolidone, polyacrylic acid, xanthan gum, gum arabic, other natural resins and mixtures of any of these resins. Additionally, borax can be a carrier for fragrances or other litter additives, in a ratio of typically less than 1:1 borax: additive.

The invention is further illustrated in the Experimental Section:

Experimental

A series of performance tests were conducted on the novel litters of the invention.

Figure 1:
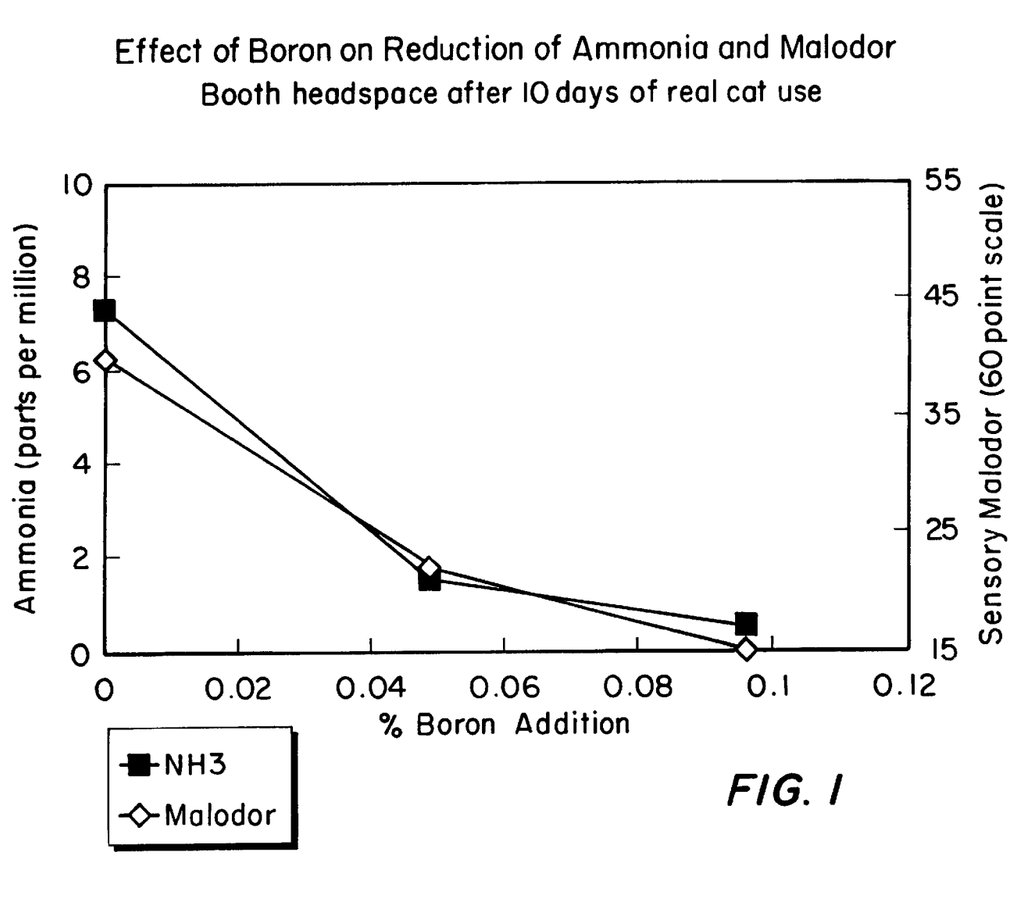
FIG. 1 is a graphical depiction of the effect of adding various amounts of boron compound to clumping clay litters in a realistic 10 day use test (booth test).
Figure 2:
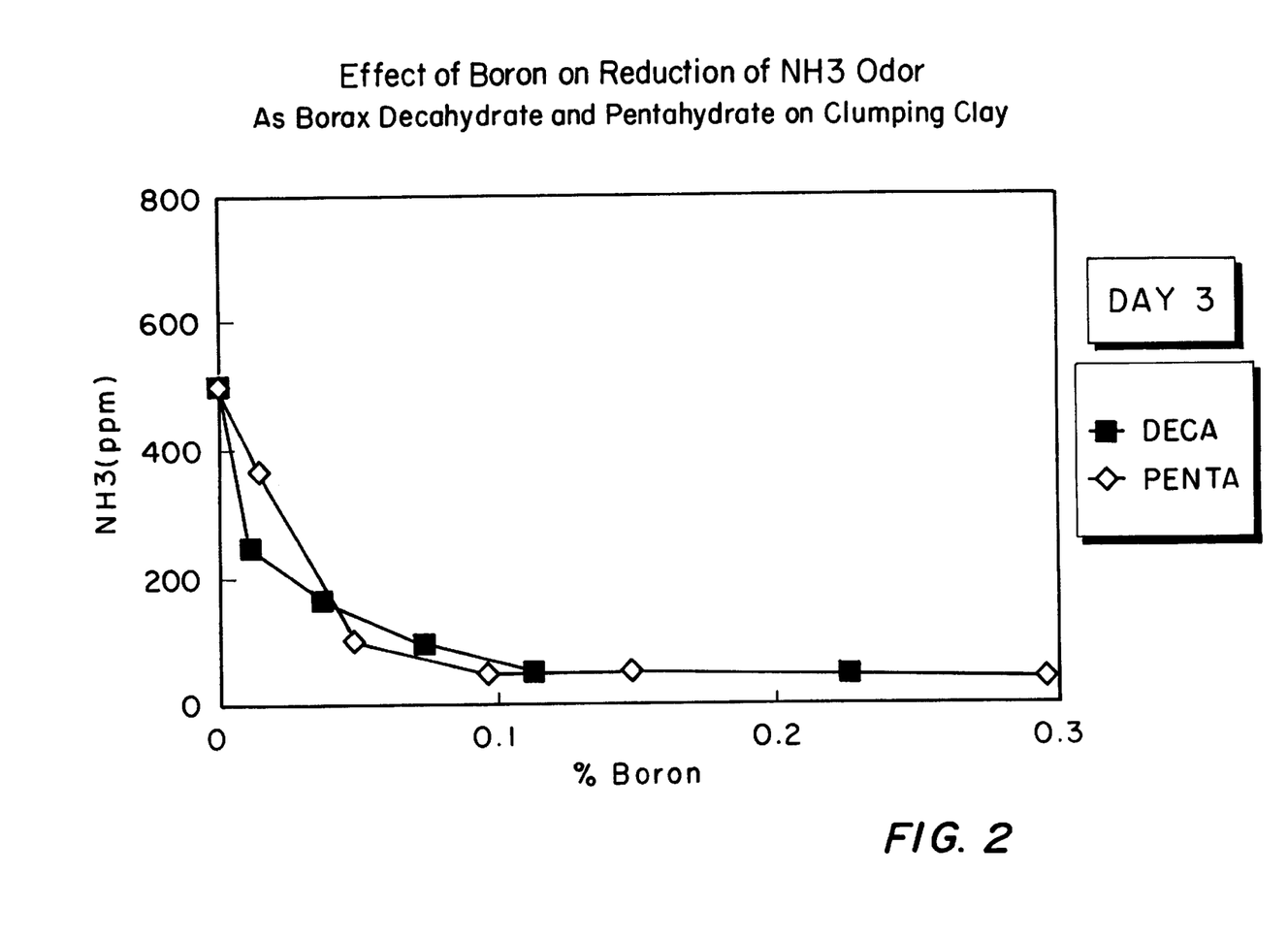
FIG. 2 demonstrates the effectiveness of odor control by borax pentahydrate and decahydrate over a three-day period as compared to a control in an ammonia control jar test.
Figure 3:
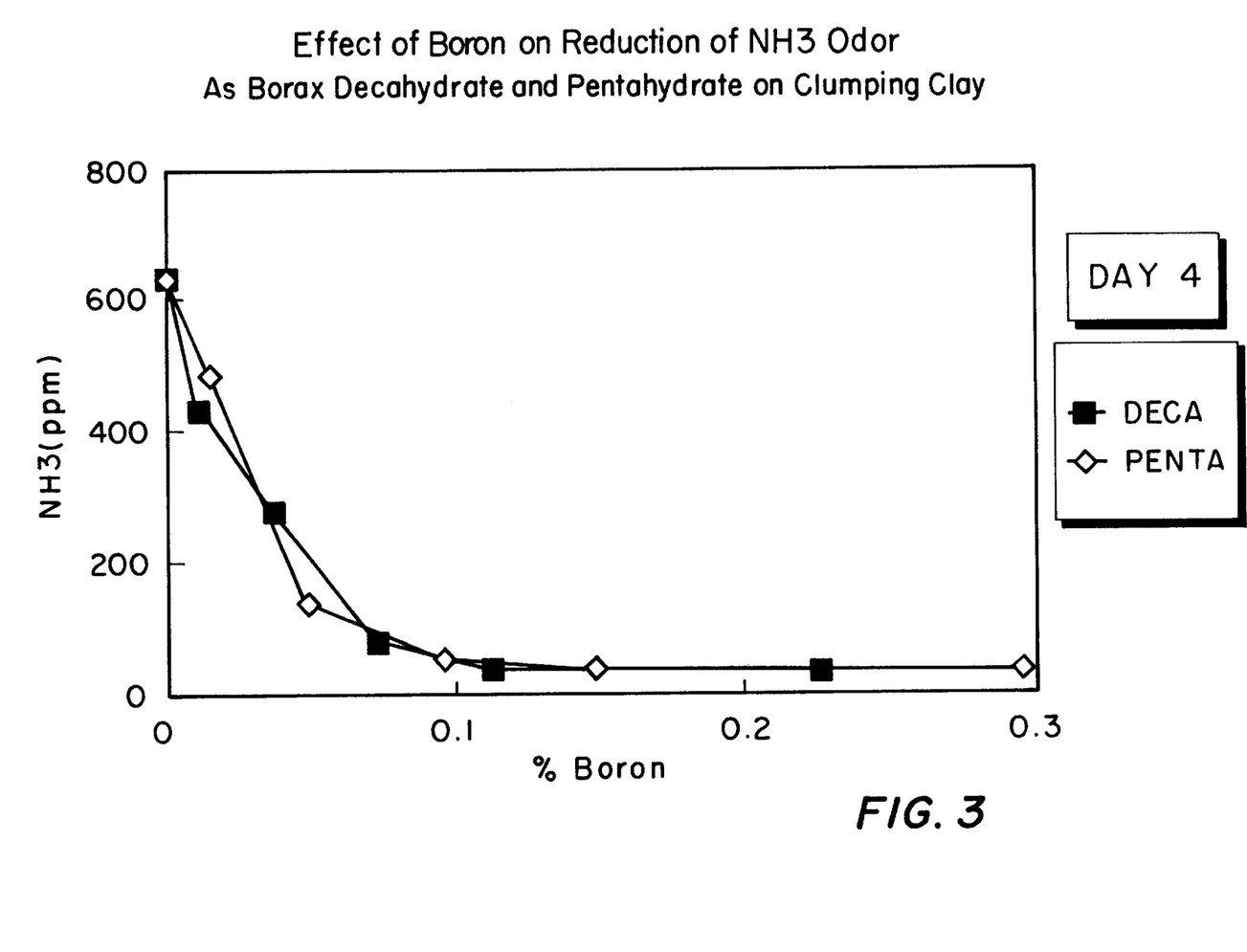
FIG. 3 demonstrates the effectiveness of odor control by borax pentahydrate and decahydrate over a four-day period as compared to a control in an ammonia control jar test.
Figure 4:
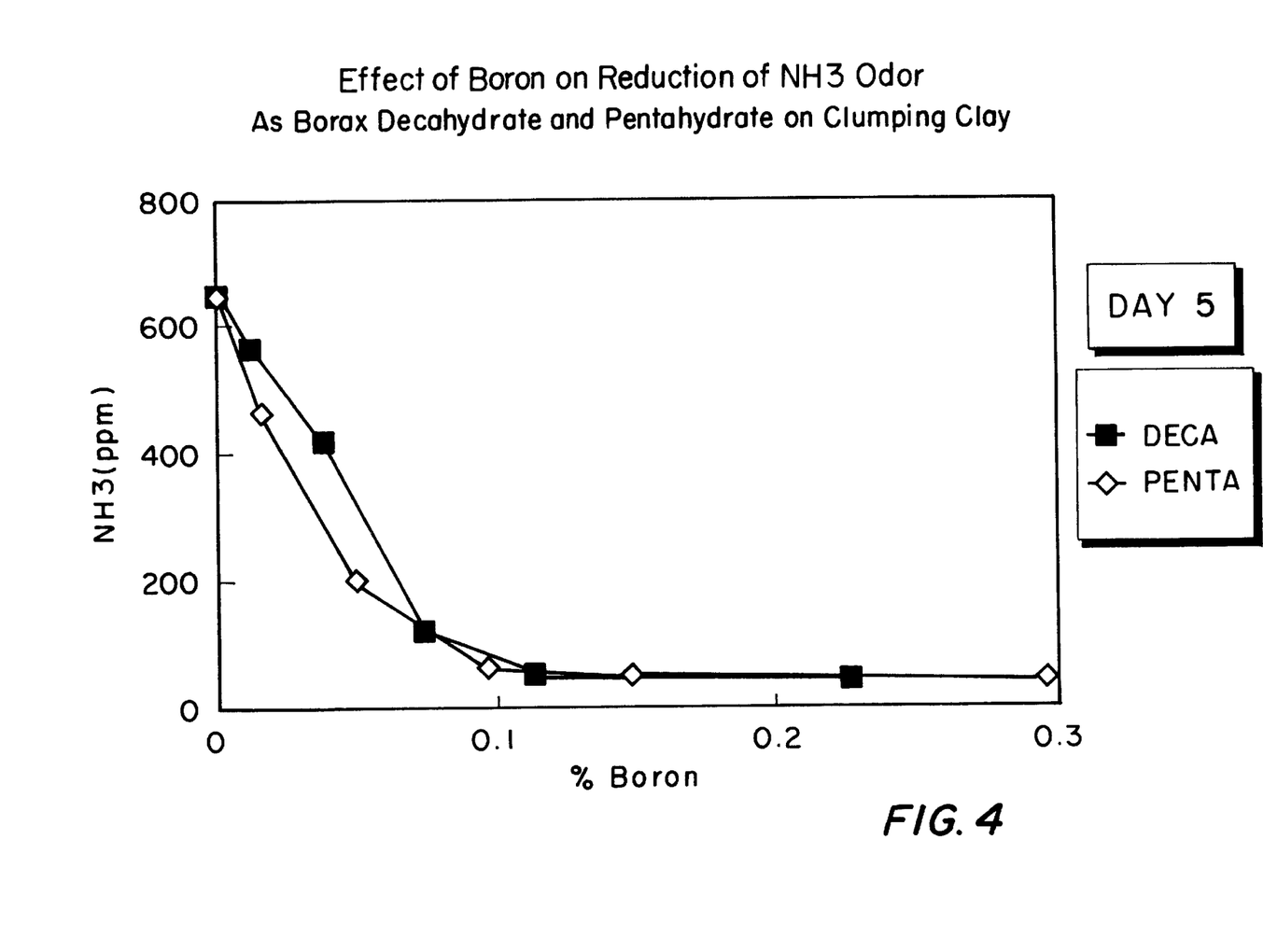
FIG. 4 demonstrates the effectiveness of odor control by borax pentahydrate and decahydrate over a five-day period as compared to a control in an ammonia control jar test.
Figure 5:
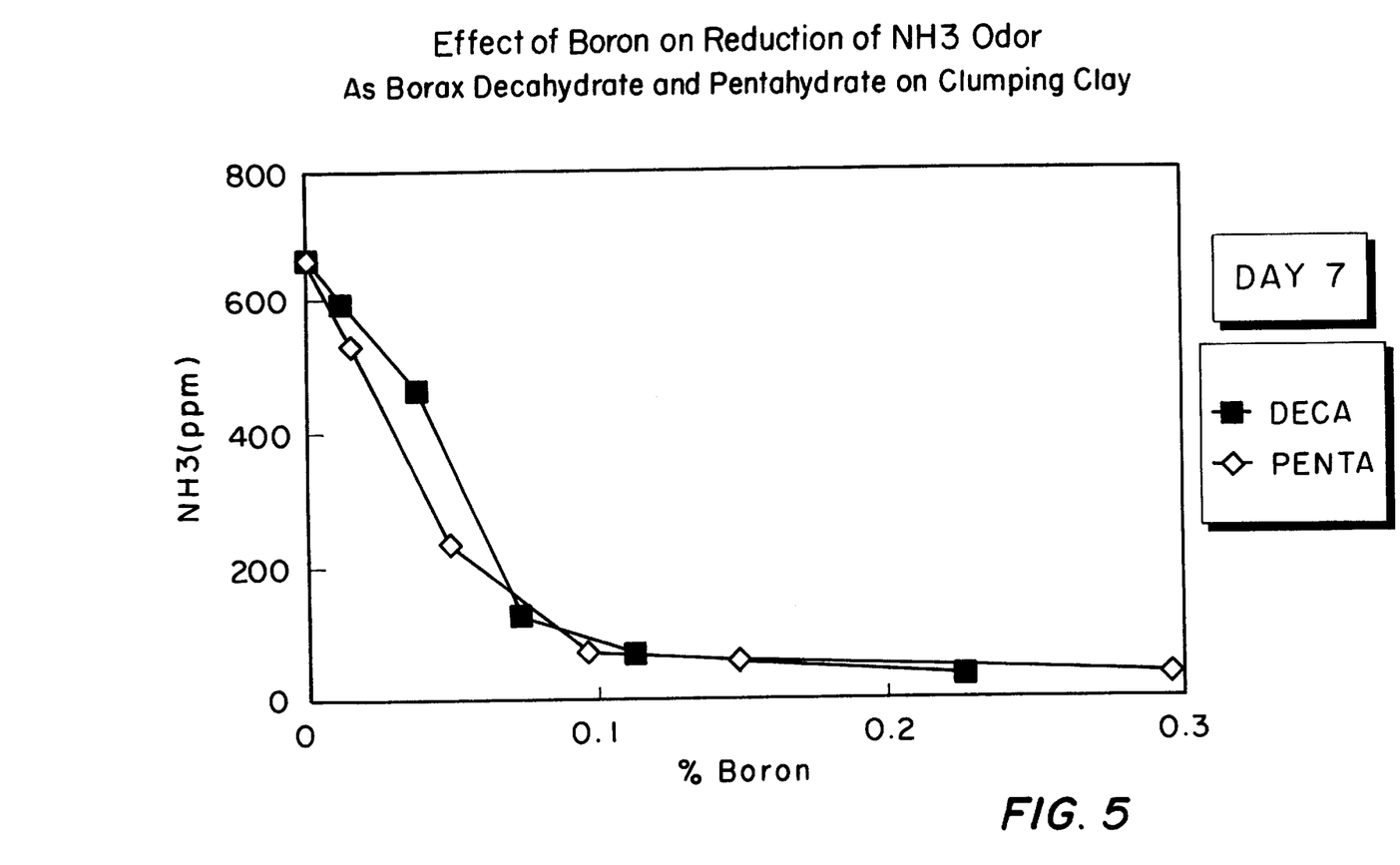
FIG. 5 demonstrates the effectiveness of odor control by borax pentahydrate and decahydrate over a seven-day period as compared to a control in an ammonia control jar test.
Figure 6:
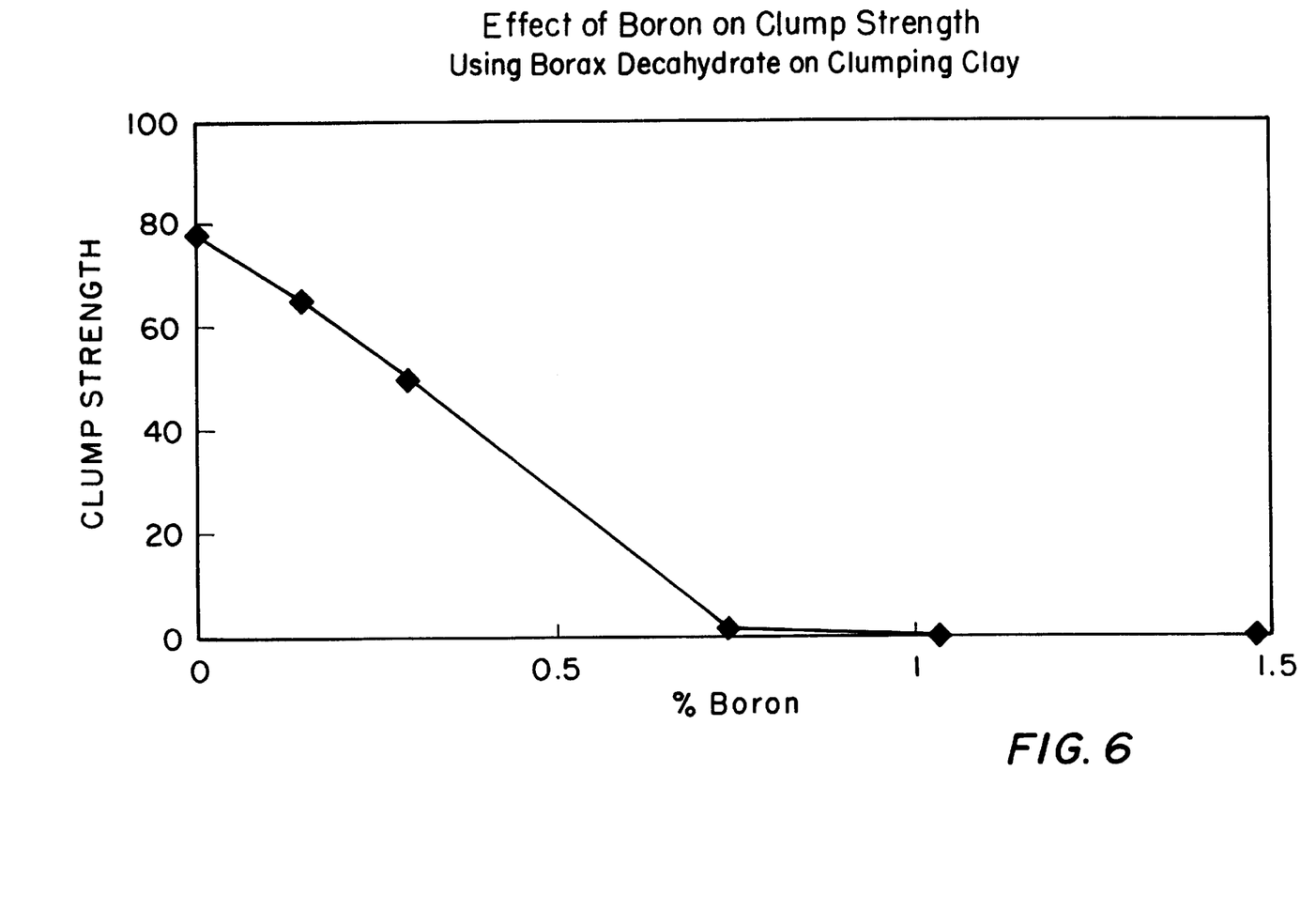
FIG. 6 demonstrates the effect of borax pentahydrate on the clump strength of clumping clay.
Figure 7:
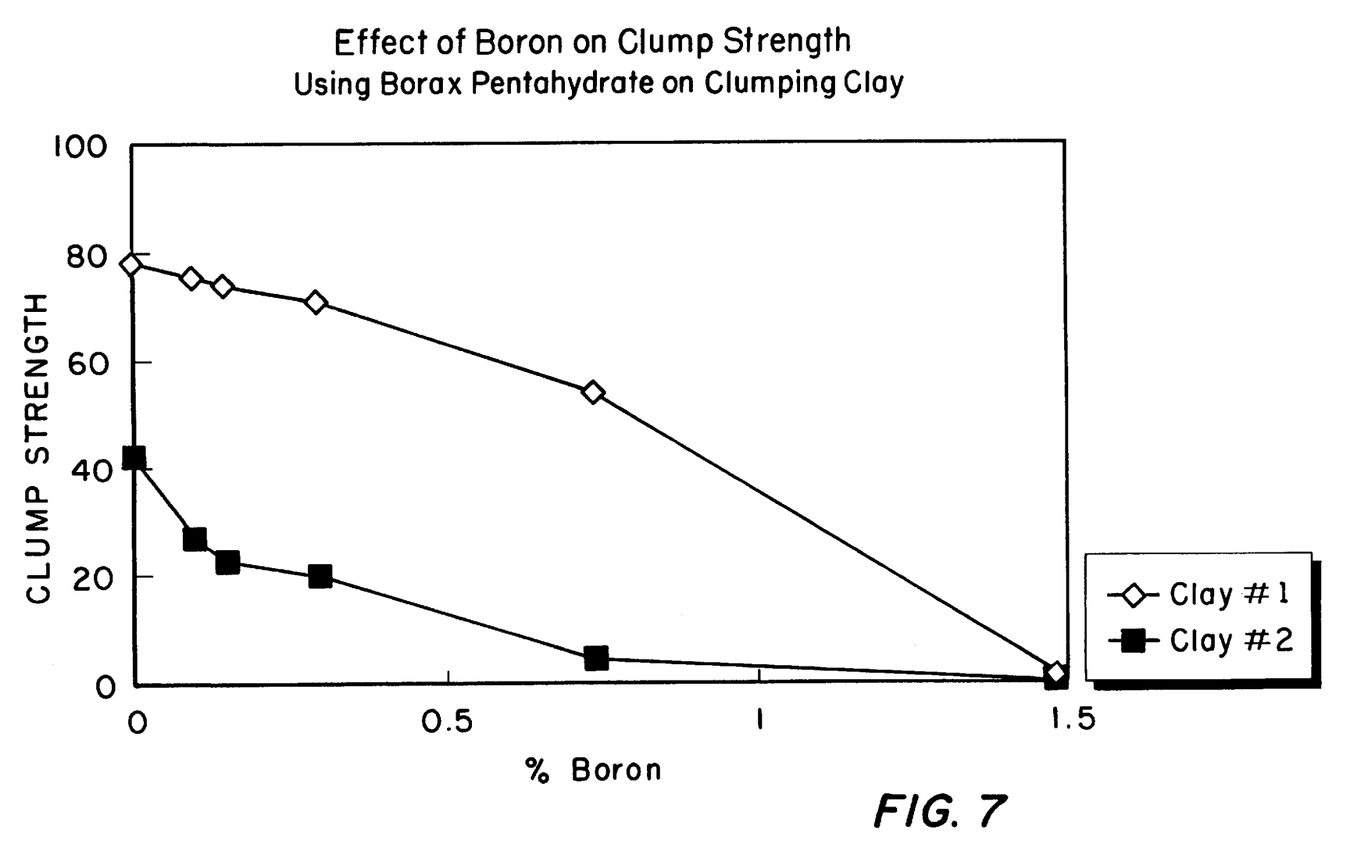
FIG. 7 demonstrates the effect of borax decahydrate on the clump strength of a clumping clay.

EXAMPLES 1–3/FIG. 1
Effect of Boron Compound on Reduction of Ammonia and Malodor In this test, bentonite clay litter was loaded into boxes, and dosed twice daily with appropriate amounts of cat urine and cat feces to simulate "real cat use." These box samples were then stored and treated for 10 days at room temperature (21° C.). These boxes were then placed in a telephone booth-size booth overnight at room temperature (21° C.) and measured for ammonia ($NH_3$) generation using a Kitegawa toxic gas detector with Matheson ammonia detector tubes. In this study, because the concentration of ammonia was in a larger "headspace" than the tests of the remaining ammonia detection examples, the amounts are lower. At the same time, the samples were assayed in a "booth" test, in which a panel of screened and experienced sensory experts were asked to sniff and gauge the malodor of the samples on a 0 to 60 point scale.

Three sets of sample were assayed:
(1) 0% boron compound added (Control)
(2) 0.05% boron compound added
(3) 0.1% boron compound added The following results were obtained:

TABLE I

| Example | % added boron compound | $NH_3$ Detected | Malodor Grade |
| --- | --- | --- | --- |
| 1 | 0 | 7.3 ppm | 40 |
| 2 | 0.05 | 1.5 ppm | 22 |
| 3 | 0.1 | 0.5 ppm | 15 |

As can be seen from the foregoing, the addition of boron compound significantly improved the odor control of the clumping clay litters. These results were graphically depicted in FIG. 1, wherein ammonia readings were plotted as dark boxes, and malodor readings as shaded diamonds.

EXAMPLES 4–15
Effect of Reduction of Ammonia Odor: Days 3–7

In this test, small vials were filled with bentonite clay litter which was treated with a surplus amount of cat urine. These vials were then placed into glass jars fitted with plastic lids having a single perforation. These jar samples were then stored for the indicated number of days at room temperature (21° C.) and measured for ammonia ($NH_3$) generation using a Kitegawa toxic gas detector with Matheson ammonia detector tubes. The previous examples 1–3 demonstrated odor control performance after a ten day incubation (microorganisms within the feline urine breaking down the urea into ammonia and other noxious smelling products) in a booth. However, the following tests surveyed the effective odor controlling performance of boron compounds in a high concentration of urine and with a smaller headspace, and thus, a more concentrated level of generated ammonia. Day 1 results gave no significant ammonia readings for the rather simple reason that there was not enough time for the microorganisms present in the feline urine to ferment the urea. However, significant ammonia generation was detected after three days incubation in the control litter without added boron compound. Naturally, the longer the incubation period, the more ammonia generated, hence the more intense the odor.

TABLE II

Effect of Boron Compound Addition on $NH_3$ Odor Reduction

| Example | % added boron compound | ppm $NH_3$ Detected | | | |
| --- | --- | --- | --- | --- | --- |
| | | Day 3 | Day 4 | Day 5 | Day 7 |
| 4 | 0 | 500 | 633 | 650 | 667 |
| 5 | 0.01 | 248 | 433 | 567 | 600 |
| 6 | 0.04 | 167 | 282 | 420 | 467 |
| 7 | 0.07 | 97 | 80 | 120 | 127 |
| 8 | 0.11 | 52 | 40 | 52 | 70 |
| 9 | 0.23 | 47 | 35 | 43 | 37 |
| 10 | 0 | 500 | 633 | 650 | 667 |
| 11 | 0.01 | 367 | 487 | 467 | 533 |
| 12 | 0.05 | 103 | 140 | 200 | 237 |
| 13 | 0.1 | 48 | 53 | 63 | 73 |
| 14 | 0.15 | 52 | 40 | 50 | 57 |
| 15 | 0.3 | 43 | 37 | 43 | 37 |

In Table II, Examples 4–9 are of borax decahydrate, while 10–15 are of borax pentahydrate. These results are also graphically depicted in FIGS. 2–5, in which borax decahydrate is plotted as darkened boxes, while borax pentahydrate is plotted as darkened diamonds.

In the following data, the effect of the boron compound load on clumping ability, or clump strength, was measured. Clump strength is measured here on a 0 to 100 scale. Clumps were produced using a proxy urine. The clumps were first weighed, then shaken and then measured for weight loss. Thus, the clump strength is then a % of remaining clay $((W_1-W_2) \times 100\%)$.

TABLE III

Effect of Boron on Clump Strength

| Example | % Boron Added as Borax $5H_2O$ | Clump Strength (0–100) | |
| --- | --- | --- | --- |
| | | Clay #1 | Clay #2 |
| 16 | 0 | 42.1 | 78 |
| 17 | 0.1 | 27 | 75.5 |
| 18 | 0.15 | 22.6 | 74 |
| 19 | 0.3 | 22 | 71.1 |
| 20 | 0.74 | 4.2 | 54 |
| 21 | 1.48 | 0 | 1.11 |

TABLE IV

Effect of Boron on Clump Strength

| Example | % Boron Added as Borax $10H_2O$ | Clump Strength (0–100) Clay #1 |
| --- | --- | --- |
| 22 | 0 | 77.6 |
| 23 | 0.15 | 65 |
| 24 | 0.3 | 50 |
| 25 | 0.74 | 1.4 |
| 26 | 1.04 | 0 |
| 27 | 1.48 | 0 |

The results in the foregoing Tables III and IV demonstrate that for improved odor control while retaining sufficient clumping strength, the amount of equivalent boron added to clumping clay should be maintained at a level of below about 0.8%.

While the foregoing formulations depict various embodiments of the invention, such examples are non-limiting and do not restrict the scope and content of the claimed invention. The invention is further illustrated by reference to the claims which follow hereto.

What is claimed is:

1. A clumpable animal litter with improved odor control comprising:
   (a) water-swellable clay particles capable of adhering other such particles upon contact with moisture; and
   (b) an odor controlling-effective amount of a boron compound which controls odors arising from the contact of said clay particles with moisture, the amount of said boron compound being sufficient to impart odor control without hindering the adherence or agglomeration of said clay particles when contacted with moisture, said amount being about 0.01–0.8% by weight.

2. The clumpable animal litter of claim 1 wherein the moisture is from animal waste.

3. The clumpable animal litter of claim 1 wherein said boron compound is selected from: di-alkali metal tetraborate n-hydrate, wherein n is 4, 5 or 10; boric acid; and mixtures thereof.

4. The clumpable animal litter of claim 3 wherein said boron compound has the formula:

$$Na_2B_4O_7 \times 5H_2O$$

5. The clumpable animal litter of claim 3 wherein said boron compound is a carrier for another animal litter additive.

6. The clumpable animal litter of claim 3 wherein said boron compound is added to at least a portion of the clay particles via a liquid carrier.

7. The clumpable animal litter of claim 1 wherein the odor controlling-effective amount of said boron compound is an amount which does not interfere with the adhering with the clay particles upon contact with moisture.

8. The clumpable animal litter of claim 1 wherein at least a portion of said clay particles are selected from the group consisting of alkali metal bentonites, alkaline earth bentonites, and mixtures thereof.

9. The clumpable animal litter of claim 1 wherein said clay particles have a particle size distribution of from 0.05–10,000 microns.

10. The clumpable animal litter of claim 1 further comprising at least one additional animal litter additive selected from the group consisting of dyes, pigments, additional and different bacteriostats and germicides, chemical deodorants, fragrances, dedusting compounds or agents, and mixtures thereof.

* * * * *